INVENTOR.
Leonidas P. Whorton
Eugene R. Brownscombe
Alvin B. Dyes

Patented Dec. 30, 1952

2,623,596

UNITED STATES PATENT OFFICE 2,623,596

METHOD FOR PRODUCING OIL BY MEANS OF CARBON DIOXIDE

Leonidas P. Whorton, Eugene R. Brownscombe, and Alvin B. Dyes, Dallas, Tex., assignors to The Atlantic Refining Company, Philadelphia, Pa., a corporation of Pennsylvania Application May 16, 1950, Serial No. 162,332

2 Claims. (Cl. 166—21)

This invention relates to the production of oil from a subsurface oil reservoir. More particularly, the invention relates to a method involving the injection of a gas comprising carbon dioxide into an oil reservoir under conditions such that the amount of oil recovered is greater than is recoverable by previously known methods of oil production.

In the recovery of oil from a subsurface oil reservoir, it has been the practice heretofore to permit the oil to flow from the reservoir under the force of the native reservoir energy which may be in the form of a water, gas cap, or gas drive, or combinations thereof. This production, by virtue of native reservoir energy, is commonly referred to as "primary recovery." Further, it has been common practice to augment the native reservoir energy either during the early stages of oil production or more often after the reservoir has approached its economic production limit by primary recovery methods. This may be accomplished by any one or more of several known methods including gas and water injection to provide artificial pressure drives and production in this manner is termed "secondary recovery." In providing a reservoir with such a gas or water drive it is conventional practice to inject the gas or water into the oil producing zone at relatively low pressures of the order of 1,500 p. s. i. Although these methods of secondary recovery have resulted in an increase in the ultimate recovery of oil over that possible solely by means of primary recovery methods, in some cases only about 30% to 40% of the initial oil in place is recovered and frequently as much as 50% of the oil remains after depletion of the reservoir regardless of the heretofore known method or methods of primary and secondary recovery employed for producing the oil.

Accordingly, one object of this invention is to provide an improved method for producing from an oil reservoir whereby a greater amount of oil may be recovered than otherwise might be recovered by previously known methods of primary and secondary recovery.

Another object is to provide a novel method for producing from an oil reservior which involves injecting into and passing through the reservoir in contact with the oil gas comprising carbon dioxide at a pressure in excess of 1,000 p. s. i.

A further object is to provide such a method whereby with substantially less than one, but more than 0.1, hydrocarbon pore volume of gas comprising carbon dioxide a greater amount of oil may be recovered than is recoverable by conventional methods of primary and secondary recovery.

A still further object of the invention is to provide a method for producing from an oil reservoir which involves injecting into the reservoir gas comprising carbon dioxide at a pressure greater than 1,000 p. s. i. and in an amount substantially less than one hydrocarbon pore volume, thereafter injecting inert fluid into the reservoir at the same pressure to cause the gas to pass through the reservoir in contact with the oil contained therein, and removing to the earth's surface oil swept from the reservoir.

Other objects and features of the invention will be apparent from the description and drawings which follow.

Broadly this invention is directed to a novel method for producing from an oil reservoir wherein gas comprising carbon dioxide is injected into the reservoir under conditions such that the amount of oil recovered is in excess of that possible by any of the heretofore known methods of primary and secondary recovery, the oil being produced from the reservoir primarily as a liquid. In accordance with the invention carbon dioxide or a gaseous mixture containing a substantial amount of carbon dioxide is injected into the reservoir at a pressure in excess of 1,000 p. s. i. and is caused to be passed therethrough in contact with the oil contained therein to force said oil from the reservoir, in the manner described hereinafter, preferably without decreasing substantially the reservoir pressure, but in any event without decreasing the reservoir pressure below 1,000 p. s. i. Oil forced from the reservoir by the injected gas is removed to the surface of the earth.

In another embodiment of the invention which is particularly useful where the amount of available carbon dioxide is limited, gas comprising carbon dioxide is injected into the reservoir at a pressure in excess of 1,000 p. s. i. and in an amount substantially less than one, but more than 0.1, hydrocarbon pore volume, and thereafter inert fluid, hereinafter defined, is injected into the reservoir at approximately the same pressure to cause the carbon dioxide to pass through the reservoir in contact with the oil contained therein. Oil caused to flow from the reservoir by the gas is removed to the surface of the earth without decreasing substantially the reservoir pressure.

The invention is applicable to virgin reservoirs and also partially depleted reservoirs, provided, however, that the reservoir has not been depleted to the extent that the injected gas would bypass the oil and thereby effect recovery merely by evaporation of oil into the injected gas and subsequent recovery from the gas by retrograde condensation at the earth's surface.

Figure 1:
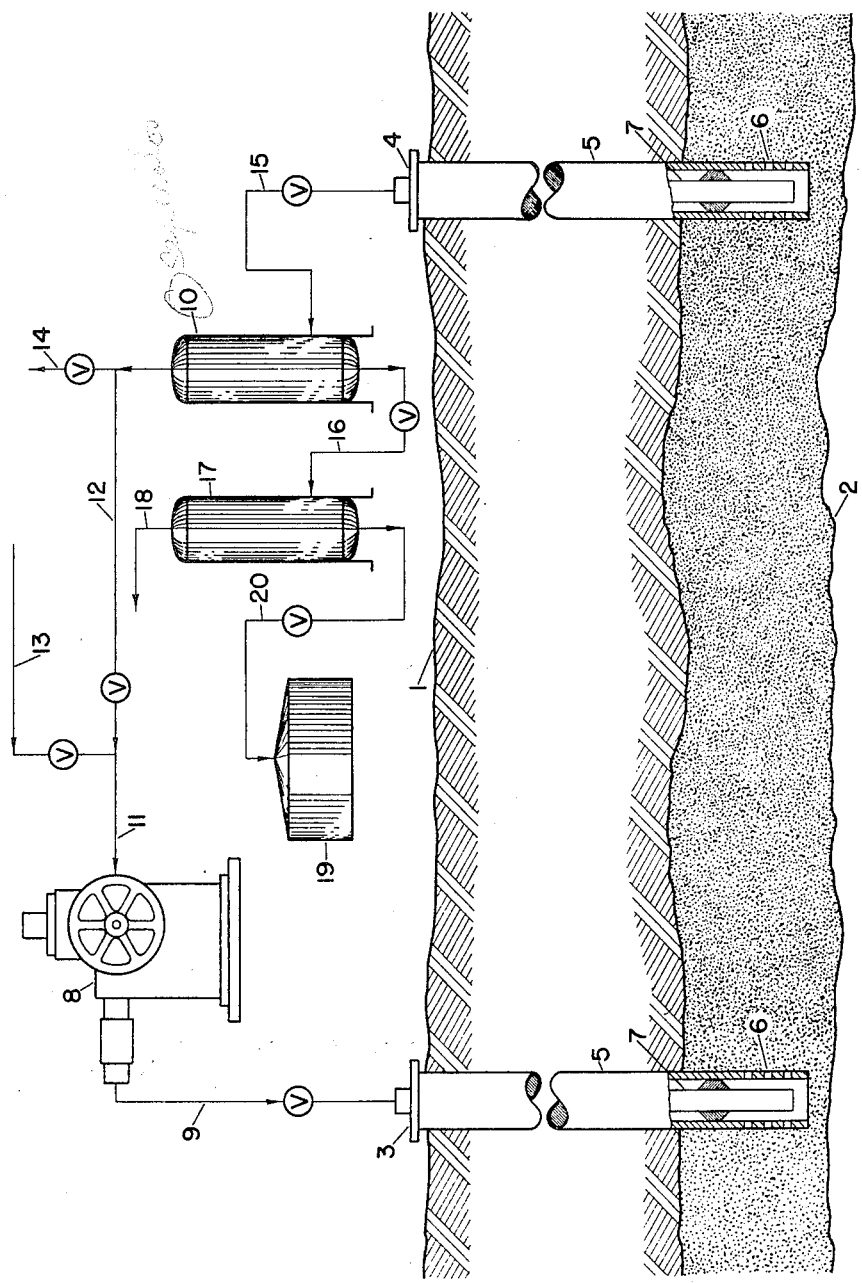
Figure 1 is a diagrammatic view showing a system for carrying out the present invention.

Referring to the drawings, and particularly at this time to Figure 1, numeral 1 denotes generally the surface of the earth. Communicating with oil reservoir 2 are injection well 3 and production well 4, the latter being drilled a suitable distance from the injection well. These wells may be of a conventional type and each includes, for example, at least a casing string 5, the interior of which is in communication with reservoir 2 through suitable perforations 6 and tubing string 7 disposed within the casing for conducting fluids to or from the reservoir.

In accordance with the invention, gas consisting of carbon dioxide or mixtures of carbon dioxide and nitrogen, air, or any other gas is compressed to a desired pressure above 1,000 p. s. i. by a suitable pump or compressor 8, which may be of any conventional type, and is passed through valve controlled pipe 9 into injection well 3 from which the injected gas flows into the reservoir to contact the oil contained therein. The injection gas obtained from a suitable external source, not shown, enters compressor 8 through valve controlled line 13 and flow pipe 11. In some instances it may be desirable to employ as the injection gas a mixture of carbon dioxide and natural gas in which case the carbon dioxide may be introduced into compressor 8 from an external suorce through valve controlled line 13, as above described, and the natural gas may be obtained from a conventional oil field separator 10, provided for stabilization of production flowing from reservoir 2 to the surface through production well 4, and conducted into compressor 8 simultaneously with the carbon dioxide through flow pipe 11 and valve controlled line 12.

Simultaneously with the injection of gas into the reservoir, oil which is swept from the reservoir by the injected gas is removed to the surface of the earth through production well 4 preferably without substantial lowering of the reservoir pressure and in any event without decreasing the pressure below 1,000 p. s. i. Most of the oil recovered by the method is in a liquid phase but a small amount flows to the well as a dense vapor phase. The gas injection is continued until the ratio of gas to oil flowing from separators 10 and 17 has reached an economic limit, such, for example, as 30,000 cubic feet per barrel.

The oil produced through well 4 flows by means of valve controlled pipe 15 into separator 10 operated at a pressure of 500 p. s. i., for example, less than the pressure of the oil at the well head, wherein the oil is stabilized. As pointed out hereinabove, the separator gas, which comprises normally gaseous hydrocarbons, may be conducted by means of flow line 12 into compressor 8, together with carbon dioxide, for injection into the reservoir through well 3. However, in cases where the injection gas consists of carbon dioxide or mixtures of carbon dioxide with gases other than normally gaseous hydrocarbons, the valve in line 12 is closed and the valve in pipe 14 is opened to permit the overhead gases to pass from the separator. The stabilized oil from separator 10 flows through valve controlled pipe 16 into a second separator 17, which preferably is operated at atmospheric pressure, wherein the oil is stabilized at such pressure. The overhead gas passing through pipe 18 preferably is employed as fuel for the operation of auxiliary field equipment. The stabilized oil is passed from separator 17 into a suitable storage tank 19 by means of valve controlled flow line 20.

It has been found that production of oil in accordance with the present invention results in an unexpected increase in the amount of oil that may be recovered over that recoverable by heretofore known methods of oil production, and therefore a corresponding decrease in the residual oil in the reservoir. This increased recovery is believed to be due to changes in the viscosity of the reservoir oil and injected gas and also to the high miscibility of the oil and gas when the carbon dioxide is brought into contact with the oil in the reservoir at pressures in excess of 1,000 p. s. i. As the injected carbon dioxide gas contacts the oil some of the oil evaporates into the carbon dioxide and simultaneously some of the carbon dioxide dissolves in the oil whereby the viscosities of the fluids approach one another. As the viscosities of the two fluids become more nearly equal the oil production approaches the condition of displacement of a fluid by a fluid of the same composition which would result in complete displacement of the contacted fluid originally in place. It is to be understood, however, that the invention is not limited by any specific theory of operation but that any theory that has been advanced is merely to facilitate the disclosure of the invention.

As pointed out above, when carbon dioxide is injected into an oil reservoir in accordance with the invention at a pressure in excess of 1,000 p. s. i. there is an unexpected increase in the amount of oil that may be recovered over that recoverable by heretofore known methods of oil production and therefore a corresponding decrease in the residual oil in the reservoir. This has been demonstrated by laboratory experiments carried out on an artificial core under conditions simulating a subterranean oil reservoir. The artificial core was prepared by filling a 25-foot length of 2-inch metal tubing having an oil jacket with 140 to 270 mesh sand. A filter was provided at either end of the tubing to retain the sand therein. A 26 liter pressure vessel used for storing the reservoir oil to be displaced was connected by means of a pipe to one end of the simulated reservoir and a suitable pump was connected in the pipe for transferring to the reservoir high pressure fluids. The carbon dioxide containing gas to be injected into the artificial reservoir was stored in a high pressure vessel having a capacity of about 30 liters and which preferably was connected by a suitable line to the same end of the reservoir as was the 26 liter storage cell, hereinbefore mentioned. To the other end of the simulated reservoir a single pipe was connected for conducting effluent from the reservoir to a high pressure visual separator which may be of any conventional design. The function of the visual separator is to permit observation of the reservoir effluent whereby a determination may be made, if desired, of whether the effluent flowing from the reservoir at any instant is a liquid or gas or a mixture thereof. From the visual separator the reservoir effluent was conducted by means of a valve controlled pipe into a second separator operated at atmospheric pressure wherein the effluent is stabilized. The stabilized liquid and the gaseous fraction from the atmospheric separator are metered to determine the volume thereof.

The laboratory experiments with the above described apparatus are conducted in the following manner. Oil which has been stabilized at atmospheric pressure, and which is referred to hereinafter as "dead" oil, is pumped into the artificial core or reservoir under a pressure of 500 p. s. i., for example, to displace air or gas or other fluid which might be present. By circulating hot oil in the jacketed section of the apparatus the core is brought up to the desired reservoir temperature. The reservoir oil is then pumped into the core from the 26 liter storage vessel until all of the dead oil has been displaced and the core is at the desired reservoir pressure, such as 4,000 p. s. i. for example. At this time injection of carbon dioxide-containing gas is commenced by displacement of such gas from the 30 liter vessel with water. As pointed out hereinabove, the gas is injected at a pressure in excess of 1,000 p. s. i. By maintaining the effluent end of the core at a pressure somewhat lower than the injection pressure, such, for example, about 50 p. s. i. lower, the injected gas is caused to flow through the core, forcing oil therefrom. The oil passes through the visual separator and into the atmospheric separator wherein it is stabilized. Gas injection is continued until the gas-oil ratio of the effluent is equal to 30,000 cubic feet per barrel.

The following examples of results obtained in the laboratory by the experiments conducted as above described at 140° F. illustrate the amount of oil that may be recovered from a reservoir by means of the present invention.

Example I

In this case pure carbon dioxide was injected into the artificial reservoir at a pressure of 4,000 p. s. i. A recovery of 96.9% of the original oil in the reservoir was realized. The reservoir oil was of the following composition.

|  | Composition of Reservoir Oil, Mol Per Cent |
|---|---|
| $C_1$ | 44.8 |
| $C_2$ | 13.0 |
| $C_3$ | 9.5 |
| $C_4$ | 6.3 |
| $C_5$ | 3.1 |
| $C_6$ | 3.8 |
| $C_{7+}$ (Av. Mol. Wt. 200) | 19.5 |
| Total | 100.0 |

Example II

Example I was repeated using injected gas consisting of 70% carbon dioxide and 30% nitrogen. In this case 83.0% of the original oil in the reservoir was recovered.

Example III

Example I was again repeated, this time employing injected gas consisting of 50% carbon dioxide and 50% nitrogen. The recovery realized was 72.5% of the original oil in place.

Example IV

In this case pure carbon dioxide was injected into the artificial core at a pressure of 2,000 p. s. i. A recovery of 90% of the original oil in the reservoir was realized. The reservoir oil was of the following composition.

|  | Composition of Reservoir Oil, Mol Per Cent |
|---|---|
| $C_1$ | 18.0 |
| $C_2$ | 10.0 |
| $C_3$ | 11.6 |
| $C_4$ | 9.1 |
| $C_5$ | 5.4 |
| $C_6$ | 3.2 |
| $C_{7+}$ (Av. Mol. Wt. 200) | 42.7 |
| Total | 100.0 |

Example V

Example IV was repeated using injected gas consisting of 70% carbon dioxide and 30% nitrogen. There was recovered from the reservoir 71.0% of the original oil in place.

Figure 2:
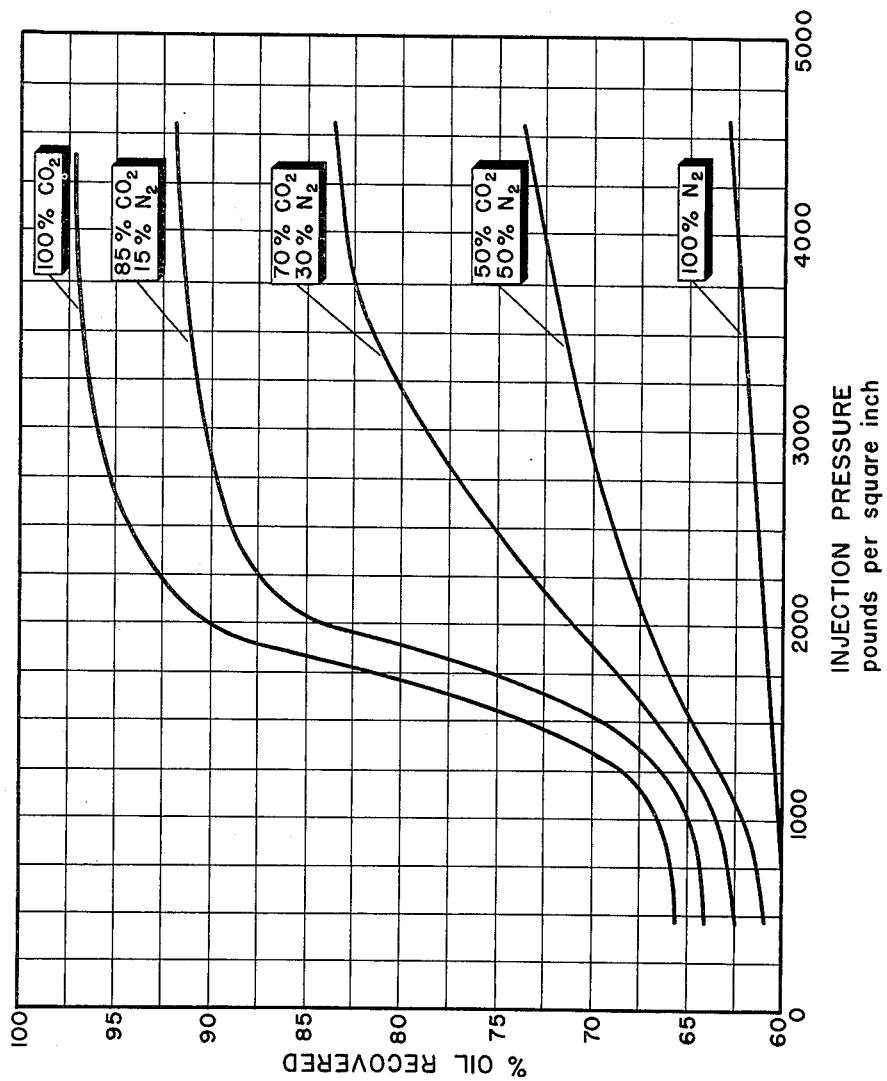
Figure 2 is a graphical representation of the relationship of per cent oil recovered to injection pressure for a series of injection gas compositions.

Referring at this time to Figure 2 of the drawings, there is shown the relationship between per cent oil recovered and injection pressure for various compositions of injected gas. It will be noted that there is a substantial increase in oil recovered at pressures in excess of 1,000 p. s. i. when employing injection gas containing a substantial amount of carbon dioxide. For purposes of comparison there is also shown oil recovery when employing nitrogen as the injection gas. It will be noted that the recovery increases very slightly with injection pressure in the later case.

Figure 3:
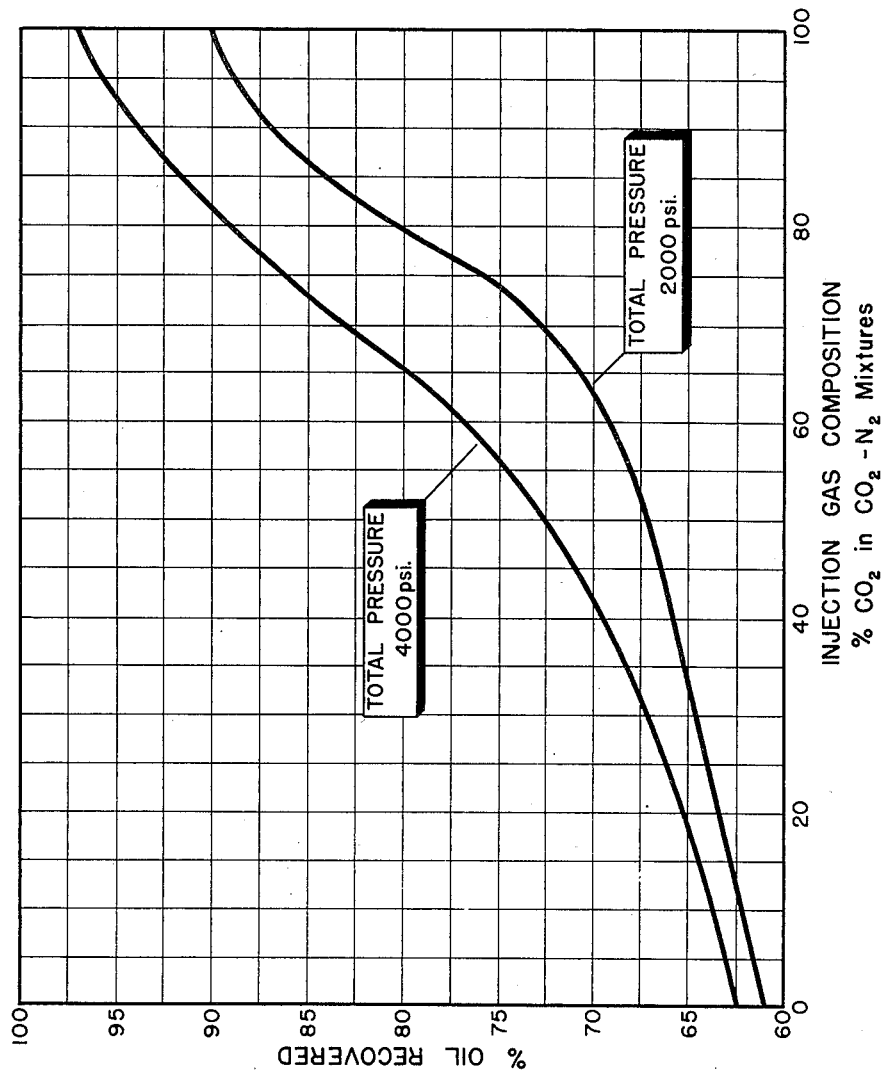
Figure 3 is a graphical representation of the relationship of per cent oil recovered to injected gas composition for injection pressures of 2,000 p. s. i. and 4,000 p. s. i.

In Figure 3 there is shown the relationship between per cent oil recovered and injection gas composition for injection pressures of 2,000 p. s. i. and 4,000 p. s. i. Although there is some increase in oil recovery with increase in carbon dioxide content of the injection gas up to 50% carbon dioxide content of the injection gas the oil recovery increases at a more rapid rate with increase in the carbon dioxide content of the injection gas above 50% carbon dioxide.

Whereas economics might dictate the use of injection gas containing only about 50% carbon dioxide, nevertheless it is possible to bring about a further increased recovery at the same pressure by the use of injection gas richer in carbon dioxide. Similarly a greater recovery may be realized at injection pressures of 3,000 p. s. i. and higher than at 1,500 p. s. i. but because of the relatively high costs involved in repressuring gas it may be preferred to inject the gas at about 1,500 p. s. i. An advantage of using pure carbon dioxide is that a high recovery may be obtained at relatively low pressures of the order of 1,500 p. s. i.

In some instances in practice, the amount of carbon dioxide available for injection into the reservoir might be relatively small. In such cases nitrogen or air or any other gas may be mixed with the available carbon dioxide and the resulting gas mixture, containing at least 50% carbon dioxide, employed as the injection gas, in accordance with the invention. Although a greater amount of oil may be recovered in this manner than is recoverable by heretofore known methods of primary and secondary recovery, the recovery is not as high as when the injection gas consists of substantially pure carbon dioxide.

Accordingly, in another embodiment of the invention, with relatively small volumes of injection gas consisting of carbon dioxide substantially the same oil recovery or degree of depletion of the reservoir may be realized as with an unlimited supply of carbon dioxide.

Referring again to Figure 1 of the drawings, in accordance with this method, carbon dioxide from a suitable external source is compressed to a pressure in excess of 1,000 p. s. i. by compressor 8 and is passed through injection well 3 into reservoir 2. The injection of carbon dioxide is continued only until a predetermined volume ascertained in a manner described below and which, in all cases, is substantially less than one, but more than 0.1, hydrocarbon pore volume, has been introduced into the reservoir. At that time injection of carbon dioxide is discontinued and injection of an inert fluid is commenced. The inert fluid likewise is injected into the reservoir at a pressure in excess of 1,000 p. s. i. and preferably at substantially the same pressure as the carbon dioxide. "Inert fluid" is used herein to denote a fluid which has low solubility in the reservoir oil. Included in such term are water, nitrogen, air, or other fluids of low solubility. The inert fluid functions to drive or force the carbon dioxide through the reservoir in contact with the oil contained therein without decreasing substantially the reservoir pressure. The inert fluid may be obtained from any convenient source and is introduced into pump or compressor 8 through valve controlled line 13 and flow pipe 11, the valve in line 12 previously having been closed.

At all times when either carbon dioxide or inert fluid is being injected into the reservoir, the reservoir at production well 4 is maintained preferably at a pressure of the same order of magnitude as at the injection well 3 but sufficiently below the injecting pressure so as to permit oil to flow through the reservoir. The oil caused to flow through the reservoir by the injected gas is removed to the surface of the earth through production well 4. Injection of inert fluid is continued until oil and carbon dioxide no longer flow from the reservoir in substantial quantities. At that time recovery of oil in accordance with this embodiment of the invention is completed.

By hydrocarbon pore volume as used herein, is meant the volume occupied by reservoir oil in that portion of the reservoir through which the injected carbon dioxide passes in flowing from the injection well 3 to the production well 4. For example, in the case of a small reservoir having substantially no channels through which the injected gas may be bypassed through only a small portion of the reservoir and with the injection well and production well communicating with the reservoir at opposite sides thereof, the hydrocarbon pore volume is equal substantially to the volume of the reservoir occupied by all of the oil. In cases where the reservoir is relatively large and the injection and production wells are located at one end of the reservoir the hydrocarbon pore volume is that volume of the reservoir occupied by the reservoir oil through which the injected gaseous carbon dioxide actually passes in moving from the injection well 3 to the production well 4. The hydrocarbon pore volume may be determined sufficiently close for the purpose of this invention in accordance with procedures well known in the industry from certain information obtained by established investigating methods. Such procedures are so well known in the art that a description thereof is unnecessary.

As above mentioned, prior to injection of the inert fluid there is introduced into the reservoir a predetermined volume of carbon dioxide, which is less than one, but greater than 0.1, hydrocarbon pore volume. Such volume may be ascertained by laboratory experiments, below described, on a core under conditions simulating recovery of oil from a subterranean oil reservoir. The core may comprise either a synthetic core formed of sand or other suitable material, such, for example, as Carborundum, or a core sample obtained from the reservoir by conventional coring methods.

The laboratory experiments for determining the volume of carbon dioxide which must be injected into the reservoir before injection of inert fluid is commenced for recovering oil in accordance with this embodiment of the invention are substantially the same as the experiments described hereinbefore in illustrating the oil recoveries realized by the invention. In the present experiments, however, a given amount of carbon dioxide such, for example, as 0.1 hydrocarbon pore volume is injected into the artificial reservoir and thereafter inert fluid is injected into the reservoir until the gas-oil ratio of the effluent is equal to 30,000 cubic feet per barrel when the inert fluid is a gas, or until water in substantial quantities appears in the effluent when the inert fluid is water. The oil recovery is then calculated in the well known manner. This procedure is repeated several times using progressively larger volumes of carbon dioxide. When the recoveries are plotted as a function of the quantity of carbon dioxide employed, it will be noted that the recovery gradually increases with increase in quantity of injected carbon dioxide up to a certain fraction of a hydrocarbon pore volume and thereafter remains substantially constant. Such fraction of a hydrocarbon pore volume of carbon dioxide must be injected into the reservoir in order to recover oil therefrom in accordance with this embodiment of the invention. It is to be understood that the quantity of carbon dioxide required is influenced by various factors, such, for example, as composition of injection gas and reservoir oil, injection pressure, and the composition of inert fluid. The volume required, however, for conditions normally encountered in practice is from 0.1 to 0.5 hydrocarbon pore volume and may be determined, as above described, in the laboratory using an artificial reservoir. The material out of which the artificial reservoir is formed should be so selected that the characteristics of the artificial reservoir approach those of the subterranean reservoir. Moreover, the pressure and temperature conditions at which the laboratory experiments are conducted should be the same as those contemplated during actual production of the oil from the reservoir.

In describing this embodiment of the invention the injection gas has been restricted to carbon dioxide. It is to be understood, however, that the injection gas may comprise carbon dioxide with minor amounts, such, for example, as 10% or less of other gases.

While in the foregoing there has been shown and described the preferred embodiment of this invention, it is to be understood that minor changes in the details of construction, combination, and arrangement of parts may be resorted to without departing from the spirit and scope of the invention as claimed. For example, whereas only a single injection and production well are shown, two or more of such wells may be utilized if desired.

We claim:

1. A method for recovering oil from a subterranean oil reservoir in communication with which are an injection well and a producing well, which comprises gas sweeping said reservoir by injecting thereinto through the injection well, in an amount substantially less than one, but more than 0.1, hydrocarbon pore volume, a single slug of gas comprising carbon dioxide, thereafter injecting through the injection well into the reservoir inert fluid to cause the slug of gas to pass through the reservoir in contact with the oil contained therein, simultaneously with the injecting steps maintaining the pressure on the reservoir in the range from 1,000 p. s. i. to 4,000 p. s. i., and removing to the earth's surface through the producing well oil swept from the reservoir.

2. A method for recovering oil from a subterranean oil reservoir in communication with which are an injection well and a producing well, which comprises gas sweeping said reservoir by injecting thereinto through the injection well, in an amount between 0.1 and 0.5 hydrocarbon pore volume, a single slug of gas comprising carbon dioxide, thereafter injecting through the injection well into the reservoir inert fluid to cause the slug of gas to pass through the reservoir in contact with the oil contained therein, simultaneously with the injecting steps maintaining the pressure on the reservoir in the range from 1,000 p. s. i. to 4,000 p. s. i., and removing to the earth's surface through the producing well oil swept from the reservoir.

LEONIDAS P. WHORTON.
EUGENE R. BROWNSCOMBE.
ALVIN B. DYES.

REFERENCES CITED

The following references are of record in the file of this patent:

UNITED STATES PATENTS

| Number | Name | Date |
| --- | --- | --- |
| 656,466 | Minor | Aug. 21, 1900 |
| 1,415,552 | Hallmark | May 9, 1922 |
| 1,511,067 | Russell | Oct. 7, 1924 |
| 1,658,305 | Russell | Feb. 7, 1928 |
| 1,697,260 | Cloud | Jan. 1, 1929 |
| 1,826,371 | Spindler | Oct. 6, 1931 |
| 1,843,002 | Small | Jan. 26, 1932 |
| 2,347,769 | Crites | May 2, 1944 |

OTHER REFERENCES

Petroleum Dictionary for Office, Field and Factory, 4th edition, 1948, Porter, page 230.